United States Patent
Salmivalli

(12) 
(10) Patent No.: US 6,324,399 B1
(45) Date of Patent: *Nov. 27, 2001

(54) METHOD AND ARRANGEMENT FOR CONTROLLING SUBSCRIBER REGISTRATIONS IN A MOBILE COMMUNICATION SYSTEM

(75) Inventor: Mika Salmivalli, Ylöjärvi (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,722
(22) PCT Filed: Sep. 16, 1997
(86) PCT No.: PCT/FI97/00554
  § 371 Date: Aug. 9, 1998
  § 102(e) Date: Aug. 9, 1998
(87) PCT Pub. No.: WO98/15133
  PCT Pub. Date: Apr. 9, 1998

(30) Foreign Application Priority Data

Sep. 17, 1996 (FI) .......................................... 963675

(51) Int. Cl.[7] .......................................... H04Q 7/20
(52) U.S. Cl. .................... 455/433; 455/435; 455/432; 455/453
(58) Field of Search ..................... 455/433, 432, 455/426, 453, 435, 518, 519, 456

(56) References Cited

U.S. PATENT DOCUMENTS

| | | | |
|---|---|---|---|
| 4,551,852 | * 11/1985 | Grauel et al. | 455/434 |
| 5,097,499 | * 3/1992 | Cosentino | 455/435 |
| 5,123,111 | * 6/1992 | Delory et al. | 455/432 |
| 5,371,900 | * 12/1994 | Bar-On et al. | 455/508 |
| 5,666,356 | * 9/1997 | Fleming et al. | 370/328 |
| 5,666,655 | * 9/1997 | Ishikawa et al. | 455/512 |
| 5,854,982 | * 12/1998 | Chambers et al. | 455/445 |
| 5,956,639 | * 9/1999 | Armbruster et al. | 455/431 |

FOREIGN PATENT DOCUMENTS 0 459 824 A2   12/1991   (EP) .
WO 91/11890    8/1991    (WO) .

OTHER PUBLICATIONS

1992, Mouly and Paulet, *The GSM System for Mobile Communications*.

Copy of the International Search Report for PCT/FI97/00554.

* cited by examiner

Primary Examiner—Dwayne Bost
Assistant Examiner—Erika A. Gary
(74) Attorney, Agent, or Firm—Altera Law Group, LLC

(57) ABSTRACT

The invention relates to a method of controlling subscriber registrations in a mobile communication system where subscriber data concerning visiting subscribers is temporarily stored in a visitor location register. The mobile subscribers are divided into subscriber groups, and subscriber registration quotas, i.e. a limited percentage of the total registration capacity is allocated to each of the subscriber groups by the operator. The visitor location register is arranged to count the number of registered subscribers in each group, and to reject further registrations in the subscriber group if the subscriber registration quota allocated to the respective subscriber group is occupied.

19 Claims, 2 Drawing Sheets

METHOD AND ARRANGEMENT FOR CONTROLLING SUBSCRIBER REGISTRATIONS IN A MOBILE COMMUNICATION SYSTEM

FIELD OF THE INVENTION

The invention relates to location updatings and subscriber registrations in a mobile communication system where subscriber data concerning visiting subscribers is temporarily stored in a visitor location register.

BACKGROUND OF THE INVENTION

In mobile communication systems where mobile stations are free to move within the system area and access the system via a base station currently selected by a respective mobile station, the aim is to maintain data concerning the location area of the mobile stations by means of their registrations, so that the system is able to route calls and offer other services to the mobile stations. The pan-European digital mobile communication system GSM has been designed to allow the users to move very widely, both in the network of the home operator and in the networks of other operators in the same country or in other countries. This means that a mobile subscriber may fully access services in many countries by means of a single subscriber contract. Such ability to move inside a mobile communication network or between different mobile communication networks is called roaming. In this connection, the mobile communication networks of different operators are called public land mobile networks (PLMN). Typically a PLMN is limited to one particular country, in addition to which each country may comprise a plurality of mobile communication networks whose coverage areas may be partly or completely overlapping.

Figure 1:
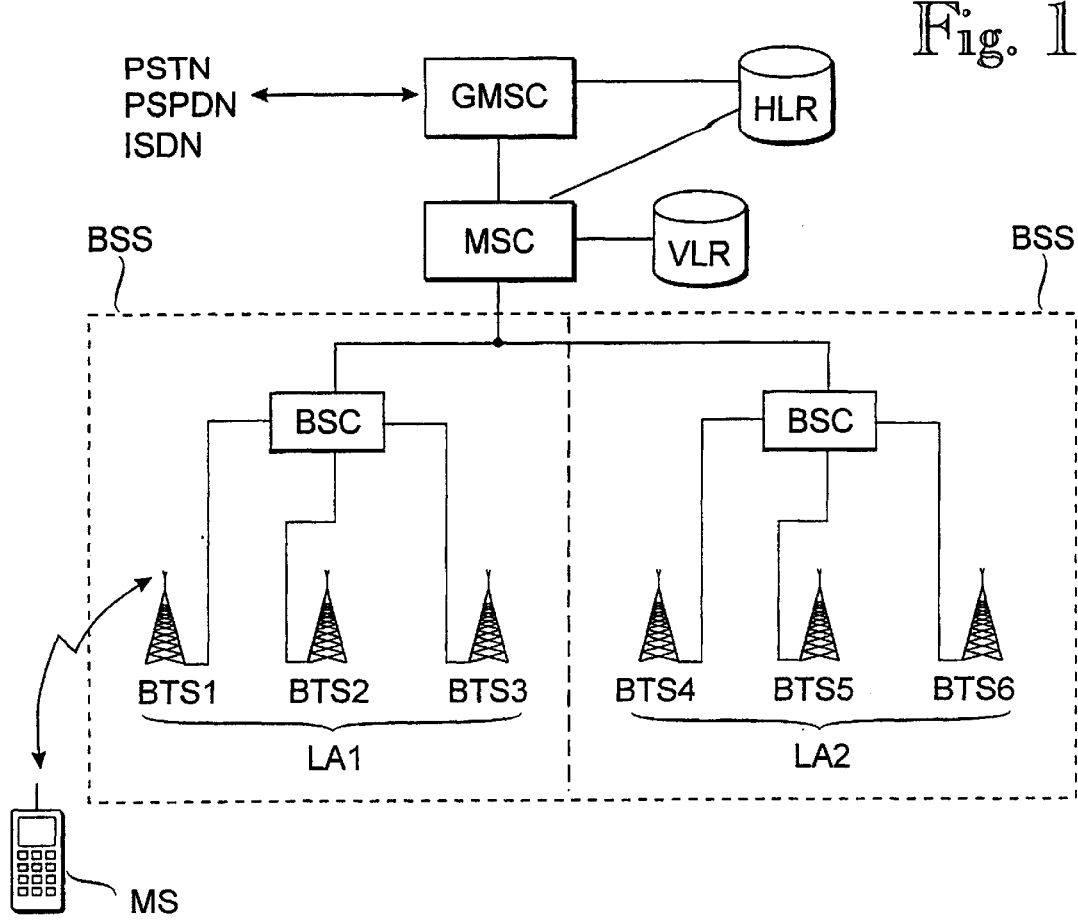

FIG. 1 in the attached drawing shows a simplified example of the structure of the GSM mobile communication system as a block diagram. The units shown in FIG. 1 also exist in other mobile communication networks, but different terms may be used for them. A mobile station MS in standby or active mode is continuously in a radio connection with one base transceiver station (BTS), in the case of FIG. 1 to the base station BTS1. The base station system (BSS) consists of a base station controller (BSC) and base stations BTS under its control. Usually several base station controllers BSC are under the control of a mobile services switching centre (MSC). A mobile switching centre MSC communicates with other mobile switching centres, and via a gateway mobile services switching centre (GMSC) with a public telephone network. Location data and other subscriber data concerning a mobile station MS are permanently stored in the home location register (HLR) of the system and temporarily in the visitor location register (VLR) in whose area the mobile station MS is currently located. The location data concerning a mobile station MS is stored in the visitor location register (VLR) with an accuracy of a location area (LA). The visitor location register (VLR) comprises necessary subscriber data concerning all mobile stations MS located in the area of the VLR.

The geographical area controlled by a visitor location register VLR is divided into one or more location areas (LA) within each of which a MS may move freely without notifying the VLR. One or more base stations BTS may operate in each location area. Base stations BTS continuously broadcast information concerning themselves and their surroundings, such as the base station identity code (BSIC), information on adjacent cells, and the location area identifier (LAI). On the basis of the latter a mobile station MS locked to the base station BTS knows in which location area LA it is currently located. If the mobile station MS notices, when changing base stations BTS, that the location area identifier LAI has changed, the mobile station sends a location updating request to the network. Location updating may be rejected e.g. if the mobile station subscriber has no respective to access services in the VLR area concerned. This rejection may result e.g. from the VLR belonging to a PLMN network with which the home PLMN operator of the mobile station MS has no roaming agreement. If the mobile station MS has no access respective in the network, a message is sent to the mobile station MS notifying of the rejection to access the network and also of failed location updating. Otherwise, the location area of the mobile station MS is updated in the visitor location register VLR in whose area the mobile station is currently located. When the mobile station MS moves to the area of a new visitor location register VLR, the subscriber data concerning the mobile station MS is registered as a visiting subscriber in the new VLR and at the same time the subscriber data concerning the mobile station MS is deleted from the VLR of the previous location area. Information on the VLR in whose area the MS is located is forwarded to the home location register HLR.

The problem in the above registration of a mobile station in connection with location updating is that the visitor location register is loaded by the registration of all mobile station subscribers arriving at the area of the visitor location register and having access rights to the network. When the storage capacity of the visitor location register is used, no new mobile station subscriber registrations can be accepted, and thus further location updates have to be rejected. If an area comprises many visiting subscribers from other networks, for example, the capacity of the network does not necessarily remain sufficient to serve its own subscribers.

BRIEF DESCRIPTION OF THE INVENTION

It is an object of the present invention to reserve a present amount of mobile communication network capacity for desired subscriber groups, and thus to prevent overloading the network with e.g. subscribers of only one subscriber group.

This new way of limiting mobile station subscriber registrations is achieved with a method of controlling subscriber registrations in a mobile communication system where subscriber data concerning visiting subscribers is temporarily stored in a visitor location register (VLR), characterized in that the method further comprises the steps of dividing the mobile subscribers into subscriber groups, setting subscriber group-specific subscriber registration quotas, counting the number of subscribers registered in the visitor location register (VLR) per each subscriber group, and allowing or rejecting the registration of a mobile subscriber in the visitor location register (VLR) according to the subscriber registration quota and the number of currently registered mobile subscribers of the respective subscriber group.

The invention also relates to an arrangement for controlling subscriber registrations in a mobile communication system comprising at least one visitor location register (VLR) for temporary storage of subscriber data concerning mobile subscribers visiting the area of the register, characterized in that the arrangement comprises mobile subscribers being arranged into subscriber groups, means for counting the number of subscribers registered in the visitor location register (VLR) per each subscriber group, and means for limiting the number of mobile subscribers to be registered in the visitor location register on the basis of the counting results of the counting means.

A new kind of location updating is achieved with a method of controlling location updating in a mobile communication system where subscriber data concerning visiting subscribers is temporarily stored in a visitor location register (VLR), said method comprising the steps of sending a location updating request when the mobile subscriber has moved to the area of a new visitor location register (VLR), characterized in that the method further comprises the steps of dividing the mobile subscribers into subscriber groups, setting subscriber group-specific subscriber registration quotas, counting the number of subscribers registered in the visitor location register (VLR) per each subscriber group, rejecting the location updating of a mobile subscriber in the new visitor location register (VLR) when the subscriber registration quota of the subscriber group to which the mobile subscriber belongs is occupied according to the counted number of registrations, and allowing the location updating of a mobile subscriber in the new visitor location register (VLR) when the subscriber registration quota of the subscriber group to which the mobile subscriber belongs is unoccupied according to the counted number of registrations.

The invention is based on the idea that only a preset maximum number of subscribers belonging to a preset subscriber group is allowed to be simultaneously registered in a network visitor location register. The user groups and the number of registrations allowed in each group are defined by the operator. The invention enables the registration of subscribers from different user groups in the network in a ratio chosen by the operator. The invention allows the operator to allocate always a predetermined portion of the network capacity to the subscribers of any specified subscriber group, e.g. home network subscribers, and to avoid overload due to the visiting subscribers.

The arrangement for controlling subscriber registrations comprises counting means, preferably counters, for counting the number of subscribers registered from different subscriber groups, and comparison means on the basis of whose outputs the registration is limited. The comparison means are used for comparing the values calculated by the counting means with preset maximum values.

A BRIEF DESCRIPTION OF THE DRAWINGS

Figure 2:
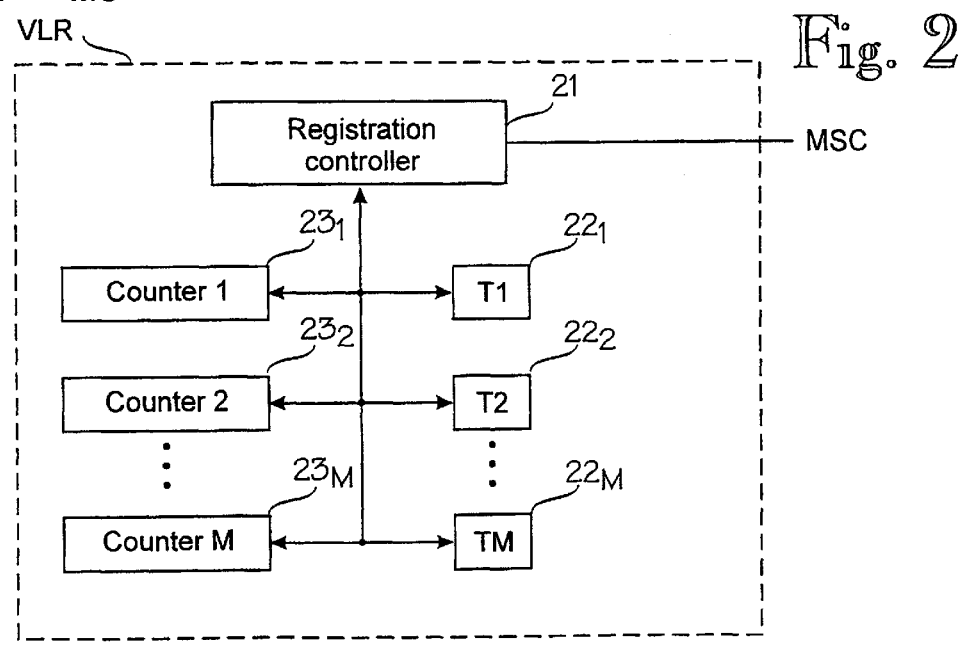
Figure 4:
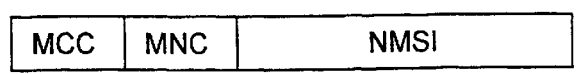
Figure 3:
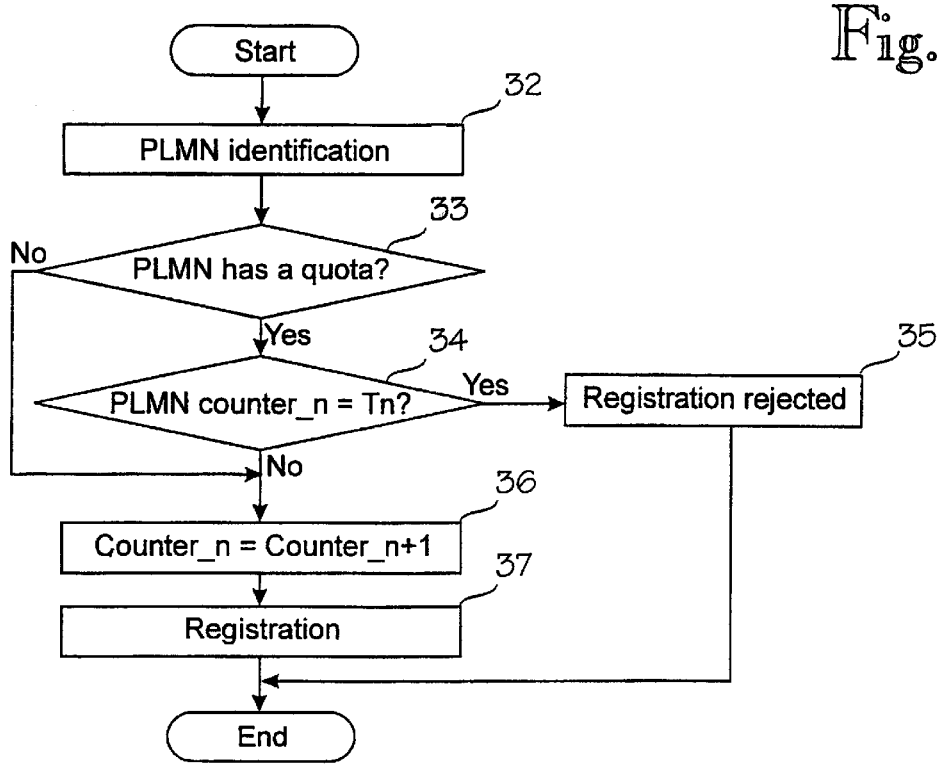
Figure 5:
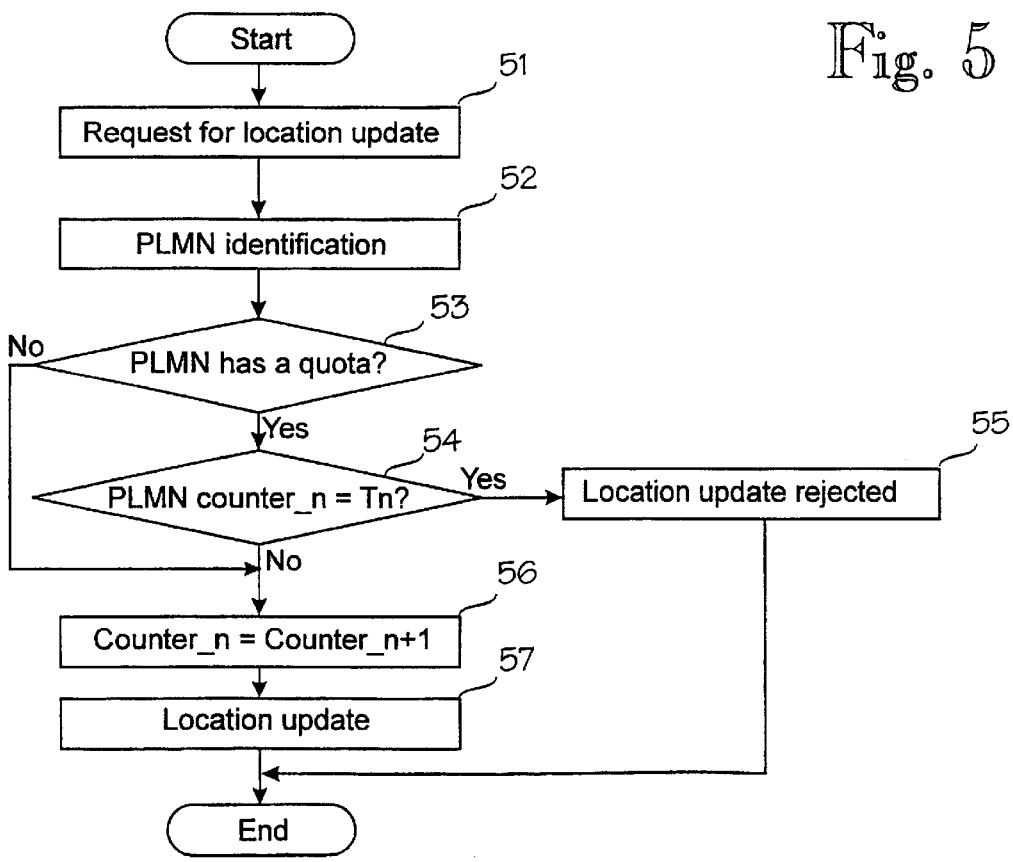

The invention will be described below in greater detail with reference to the attached drawings, in which FIG. 1 is a block diagram showing the structure of a mobile communication system, FIG. 2 is a block diagram of a visitor location register implementing a preferred embodiment of limiting registration according to the invention, FIG. 3 is a flow diagram of a preferred embodiment of the method of the invention, FIG. 4 shows the structure of an IMSI according to the GSM specifications, and FIG. 5 is a flow diagram of a secondary embodiment of the method of the invention.

DETAILED DESCRIPTION OF THE INVENTION

The present invention can be implemented in connection with any mobile communication system. Below, the invention will be described in more detail mainly in connection with the pan-European digital GSM mobile communication system by way of example. FIG. 1 shows a simplified structure of the GSM network described above. As to a more detailed description of the GSM system, reference is made to GSM recommendations and to the publication "The GSM System for Mobile Communications", M. Mouly & M. Pautet, Palaiseau, France, 1992, ISBN:2-9607190-0-7.

In the present application, a visitor location register VLR refers to any register of any mobile communication system for temporary storage of subscriber data concerning a mobile station when the mobile station MS is roaming in the mobile communication system.

Controlling subscriber registration according to the present invention is applied to any visitor location register or corresponding other register in connection with registration. Such registration takes place e.g. in connection with location updating and the switching on of a mobile station MS. The registration according to the invention is also carried out in connection with a mobile station MS terminating call if the visitor location register VLR has for some reason, e g. service failure of the VLR, lost the subscriber data concerning the mobile station MS.

The arrangement according to the invention is preferably carried out with means arranged in connection with a visitor location register VLR. The arrangement may also be located e.g. in a home location register HLR, in a gateway GMSC or in connection with some other network element, whereby registration signalling has to be arranged between the visitor location register VLR and the arrangement of the invention. The arrangement conforming with the invention may also be implemented decentralized in different network elements, and arranged in one or more different data structures.

In the following a primary embodiment wilt be described with reference to FIG. 2. In the embodiment, the number of subscribers registered in each visitor location register VLR is limited subscriber group-specifically by an arrangement located in the specified VLR. FIG. 2 is a block diagram of a visitor location register according to the invention showing only the components of the visitor location register that are relevant to the invention. The visitor location register VLR of FIG. 2 is connected to a mobile switching centre MSC and via the centre to the rest of the network. A registration control unit 21 controls the registration process. Each subscriber group (M in total) have a dedicated register $22_1$ to $22_M$, including preset parameters for said subscriber group, such as the subscriber group identifier and the maximum number $T_n$ of subscribers. The maximum value $T_n$ set on each subscriber group may be different or identical. The number of registers 22 may be reduced by setting the same maximum value $T_n$ on a plurality of subscriber groups, whereby the preset parameters of these subscriber groups may preferably be placed in one common register 22. The maximum value $T_n$ set on the register $22_n$ of the subscriber group n may also indicate that no value limiting the number of subscribers is used for said subscriber group. In this case the comparison and limitation of the method according to the invention are bypassed as will be described below. Additionally, a counter $23_1$ to $23_M$ has been reserved for each subscriber group for counting the number of registered mobile subscribers by subscriber group. The registration control unit 21 uses these registers and counters for making a registration decision in a mobile communication system in accordance with the invention as will be described below.

FIG. 3 is a flow diagram of a primary embodiment of the invention. In the primary embodiment the subscriber registration limitation is implemented by dividing the mobile subscribers into different subscriber groups on the basis of the home PLMN of a MS.

At step 32 in FIG. 3 the subscriber group of a mobile station MS is identified on the basis of e.g. the mobile subscriber identifier IMSI (International Mobile Subscriber Identity) used in the GSM network. FIG. 4 shows the information contents of the IMSI according to the GSM specifications. The first three characters of the IMSI are reserved for the mobile country code (MCC). The next two characters MNC (Mobile Network Code) specify the home PLMN network of the mobile station. The rest of the characters are reserved for the mobile subscriber identification number (NMSI). Thus, the home PLMN information of a mobile station is derived from the IMSI in a manner known per se.

At step 33 in FIG. 3 a test is made to see if a subscriber registration quota is set on the PLMN of the mobile station for controlling subscriber registrations. A subscriber registration quota means that only a limited percentage of the register capacity of the network is allocated to the subscribers of the specific PLMN. Typically the subscriber registration quota is presented by means of a maximum number of simultaneous subscriber registrations. If no limiting value has been set on the PLMN, the mobile station MS is registered in the usual manner as presented above in connection with the description of prior art. The counting of registered subscribers according to the invention may be performed even if no subscriber registration quota is set for the PLMN, provided counting means are arranged for the subscriber group. Implementing the counting without restricting the number of subscribers, as described below, may be desirable e.g. for purposes of statistical analyses or if it is desirable to set a registration limit value on the PLMN later. When the operator has set a subscriber registration quota for the PLMN, at step 34 the number of registered subscribers in said PLMN is compared with the maximum value $T_n$ set by the operator on said PLMN, i.e. it is tested if the value of counter $23_n$ is equal to the maximum value $T_n$ set on register $22_n$. If the value of counter $23_n$ corresponds to the maximum value $T_n$, at step 35 the registration of the mobile station MS is rejected in the visitor location register VLR. A notification of a rejected registration may be sent to the mobile station MS e.g. in a message indicating "IMSI unknown in HLR" as the reason or in the form of any other appropriate short message.

When the number of subscribers of a subscriber group registered in the network has not reached the allowed number, i.e. when the value of the PLMN counter $23_n$ is not equal to the maximum value $T_n$ set on the register $22_n$, the value of counter $23_n$ is incremented by one (step 36) in this example, and the mobile station is registered in the visitor location register VLR (step 37). Registering a mobile station MS in a new visitor location register VLR, e.g. in connection with location updating, will require that the subscriber data of the mobile station is deleted from the visitor location register VLR of the previous location area LA. In connection with deletion of subscriber data in the old visitor location register, the value of the counter $23_n$ of the respective subscriber group is decremented by one in this example. The value of the subscriber group counter $23_n$ is also decremented when a mobile station MS belonging to the group leaves or is removed from the area of a VLR for some other reason than described above, e.g. when the mobile station has not been active during a preset period of time defined by the operator.

In the above described primary embodiment the counting means have been implemented by counters counting upwards in steps of one. The counting may also be implemented by counters counting e.g. downwards or in steps of more than one unit. Setting the maximum value $T_n$ and comparing the value of the counter with the maximum value $T_n$ has to be appropriately arranged for each counter implementation selected.

FIG. 5 is a flow diagram of a secondary embodiment of the invention. In this embodiment, registrations are limited in connection with location updating, when the mobile station has moved to the area of another visitor location register VLR. At step 51 the mobile station MS sends a location updating request to the network. At step 52 the subscriber group of the mobile station is identified on the basis of the IMSI sent in connection with the location updating request in the same manner as described above with reference to the primary embodiment. The observations made at steps 53 and 54 correspond to those of points 33 and 34 described above with reference to the primary embodiment. If the value of counter $23_n$ corresponds to the maximum value $T_n$, the location updating of the mobile station MS is rejected at step 55. The mobile station may be notified of rejected location updating by e.g. a message giving "IMSI unknown in HLR" as the reason, or in the form of any other appropriate short message sent to the mobile station. When the value of the PLMN counter $23_n$ is not equal to the maximum value $T_n$ set for register $22_n$, the value of counter $23_n$ is incremented by one (step 56) in this example, and the location of the mobile station is updated (step 57). The subscriber data of the mobile station MS is deleted from the visitor location register of the previous location area LA of the mobile station MS, and the value of the counter $23_n$ of the respective subscriber group is decremented by one in this example.

In an embodiment of the invention, compilation of statistics concerning rejected registrations is added to the above described embodiments. Compilation of statistics may be arranged e.g. subscriber group-specifically or subscriber group and VLR-specifically. Statistics are preferably compiled by counting the number of rejected registrations.

Subscriber groups used in other embodiments of the present invention may be formed on the basis of e.g. the IMSI country code MCC or the MNC information on the home PLMN. In the method according to the invention, a subscriber group may also be formed e.g. of subscribers of several PLMNs. Almost any easily available number or other identification may be used as a criterion in dividing mobile subscribers into different subscriber groups. If needed, PLMN subscribers may also be divided into smaller subscriber groups on the basis of e.g. the subscriber identification number field NMSI of the IMSI. One way to divide mobile subscribers is division into two subscriber groups, the first group comprising (home) subscribers of the PLMN network of the limiting visitor location register VLR and the second group comprising the (visiting) subscribers of all other PLMN networks.

In the arrangement of the invention described above it is not necessary to arrange counters and registers for all subscriber groups if there is no wish to limit or follow the number of the registered subscribers of that particular subscriber group. In this case the operation according to the invention is bypassed and the registration of a mobile station MS is performed in a manner known in the prior art. A counter may, however, be allocated to a subscriber group for counting the number of registered subscribers even if no subscriber registration quota is set on said subscriber group. Thus the functionality according to the invention may be taken into effective use immediately when a subscriber registration quota is later set on the subscriber group.

It is also possible to implement the arrangement of the invention in some visitor location registers of a mobile communication system only. A specific subscriber group division and/or specific maximum subscriber numbers in subscriber groups may be set on each visitor location register VLR of the network.

A functionality may be added to the different embodiments of the invention wherein the arrangement according to the invention sends to the operator notifications, e.g. when the value of the counter of one of the subscriber groups approaches the maximum value set on the register, or has reached said maximum value.

The drawings and the related description are only intended to illustrate the idea of the invention. The details of the limitation of registrations according to the invention may vary within the scope of the claims. Although the invention has been described above mainly in connection with subscriber groups identified on the basis of the IMSI, the invention may also be employed based on other kinds of subscriber group division or prioritizing.

What is claimed is:

1. A method of controlling subscriber registrations in a mobile communication system where subscriber data concerning visiting subscribers is temporarily stored in a visitor location register, the method comprising:

dividing the mobile subscribers into subscriber groups, setting subscriber group-specific subscriber registration quotas, counting a number of subscribers registered in the visitor location register per each subscriber group, and allowing or rejecting the registration of a mobile subscriber in the visitor location register according to the subscriber registration quota and the number of currently registered mobile subscribers of the respective subscriber group which the respective mobile subscriber belongs to.

2. A method as claimed in claim 1, further comprising rejecting the registration of a mobile station in the visitor location register when the subscriber registration quota of the subscriber group to which the mobile subscriber belongs is occupied, and allowing the registration of the mobile station in the visitor location register when the subscriber registration quota of the subscriber group to which the mobile subscriber belongs is unoccupied.

3. A method as claimed in claim 2, further comprising:

counting the subscribers of the subscriber group registered in the visitor location register further comprising increasing the number of registered subscribers of the subscriber group of the mobile subscriber when the mobile subscriber is registered, and decreasing the number of registered subscribers of the subscriber group of the mobile subscriber when the subscriber data of the mobile subscriber is deleted from the visitor location register.

4. A method as claimed in claim 3, further comprising:

comparing the counted number of registered subscribers of the subscriber group of the mobile subscriber with a preset maximum value, rejecting the registration of the mobile subscriber in the visitor location register when said counted number matches with said maximum value, and allowing the registration of the mobile subscriber in the visitor location register when said counted number does not match with said maximum value.

5. A method as claimed in claim 2, further comprising:

comparing the counted number of registered subscribers of the subscriber group of the mobile subscriber with a preset maximum value, rejecting the registration of the mobile subscriber in the visitor location register when said counted number matches with said maximum value, and allowing the registration of the mobile subscriber in the visitor location register when said counted number does not match with said maximum value.

6. A method as claimed in claim 2 further comprising sending the mobile station a message indicating the reason for the rejection in response to the step of rejecting the registration.

7. A method as claimed in claim 2, further comprising compiling statistics on the rejected registrations.

8. A method as claimed in claim 1, further comprising counting the subscribers of the subscriber group registered in the visitor location register further comprising increasing the number of registered subscribers of the subscriber group of the mobile subscriber when the mobile subscriber is registered, and decreasing the number of registered subscribers of the subscriber group of the mobile subscriber when the subscriber data of the mobile subscriber is deleted from the visitor location register.

9. A method as claimed in claim 8, further comprising:

comparing the counted number of registered subscribers of the subscriber group of the mobile subscriber with a preset maximum value, rejecting the registration of the mobile subscriber in the visitor location register when said counted number matches with said maximum value, and allowing the registration of the mobile subscriber in the visitor location register when said counted number does not match with said maximum value.

10. A method as claimed in claim 1, further comprising comparing the counted number of registered subscribers of the subscriber group of the mobile subscriber with a preset maximum value, rejecting the registration of the mobile subscriber in the visitor location register when said counted number matches with said maximum value, and allowing the registration of the mobile subscriber in the visitor location register when said counted number does not match with said maximum value.

11. A method as claimed in claim 1, further comprising sending the mobile station a message indicating the reason for the rejection in response to the step of rejecting the registration.

12. A method as claimed in claim 1, further comprising compiling statistics on the rejected registrations.

13. A method of controlling location updating in a mobile communication system where subscriber data concerning visiting subscribers is temporarily stored in a visitor location register said method comprising sending a location updating request when the mobile subscriber has moved to the area of a new visitor location register the method further comprising:

dividing the mobile subscribers into subscriber groups, setting subscriber group-specific subscriber registration quotas, counting the number of subscribers registered in the visitor location register per each subscriber group, rejecting the location updating of a mobile subscriber in the new visitor location register when the subscriber registration quota of the subscriber group to which the mobile subscriber belongs is occupied according to the counted number of registrations, and allowing the location updating of a mobile subscriber in the new visitor location register when the subscriber registration quota of the subscriber group to which the mobile subscriber belongs is unoccupied according to the counted number of registrations.

14. An arrangement for controlling subscriber registrations in a mobile communication system comprising at least one visitor location register for temporary storage of subscriber data concerning mobile subscribers visiting the area of the register, said arrangement comprising:

mobile subscribers being arranged into subscriber groups, means for counting the number of subscribers registered in the visitor location register per each subscriber group, and means for limiting the number of mobile subscribers to be registered in the visitor location register on the basis of the counting results of the counting means.

15. A subscriber database as claimed in claim 14 wherein the subscriber database is a visitor location register.

16. An arrangement as claimed in claim 14, wherein the counting means further comprises subscriber group-specific counters adapted to increment the result of the counting by one when a mobile subscriber belonging to the respective subscriber group is allowed to register, and decrement the result of the counting by one when the registration of a mobile subscriber belonging to the respective subscriber group is deleted from the visitor location register.

17. An arrangement as claimed in claim 14, wherein the arrangement is located in the visitor location register.

18. A subscriber database for temporary storage of subscriber data concerning mobile subscribers visiting the area of the register in a mobile communication system, said database comprising:

mobile subscribers being arranged into subscriber groups, means for counting the number of subscribers registered in the visitor location resister per each subscriber group, means for limiting the number of mobile subscribers to be registered in the visitor location register on the basis of the counting results of the counting means, the counting means comprising subscriber group-specific counters adapted to increment the result of the counting by one when a mobile subscriber belonging to the respective subscriber group is allowed to register, and decrement the result of the counting by one when the registration of a mobile subscriber belonging to the respective subscriber group is deleted from the visitor location register, compare the counting result of the counting means with a preset maximum value associated with the respective subscriber group, reject further registrations of mobile subscribers belonging to said respective subscriber group in the visitor location register when the counting result and the preset maximum value match, and allow further registration of the mobile subscribers belonging to said respective subscriber group in the visitor location register when the counting result and the preset maximum value do not match.

19. An arrangement as claimed in claim 18, wherein the arrangement is located in the visitor location register.

* * * * *

UNITED STATES PATENT AND TRADEMARK OFFICE
CERTIFICATE OF CORRECTION

PATENT NO. : 6,324,399 B1
DATED : November 27, 2001
INVENTOR(S) : Salmivalli

It is certified that error appears in the above-identified patent and that said Letters Patent is hereby corrected as shown below:

<u>Title page,</u>
Item [86], § 371 Date: "Aug. 9, 1998" should read -- Aug. 5, 1998 --
Item [86], § 102(e) Date: "Aug. 9, 1998" should read -- Aug. 5, 1998 --

Signed and Sealed this

Twenty-fourth Day of September, 2002

*Attest:*

*Attesting Officer*

JAMES E. ROGAN
*Director of the United States Patent and Trademark Office*